Jan. 12, 1965 H. G. HENCKEN 3,165,471
FILTER CARTRIDGE
Filed July 6, 1960

INVENTOR.
HAROLD G. HENCKEN
BY
Robertson & Smythe
ATTORNEYS

3,165,471
FILTER CARTRIDGE
Harold G. Hencken, Greenwich, Conn., assignor to American Felt Company, Glenville, Conn., a corporation of Massachusetts
Filed July 6, 1960, Ser. No. 41,111
1 Claim. (Cl. 210—347)

The present invention relates to cartridges for cartridge type filters and particularly to a new and improved cartridge that provides a maximum effective filtering area with a minimum of filter medium.

In the prior art it is usual to provide a foraminous central tube upon which are wound layers of filtering medium, or around which a stack of washer-like discs of filter medium is provided. With such filter cartridges, the filtrate is caused to pass along radial paths, i.e., edgewise through the filtering medium. The radial paths of such constructions converge as they approach the central foraminous core, thereby detracting from the efficiency of the cartridge. Such constructions provide only a filtering surface area equal to an equivalent cylinder. Therefore, in attempting to increase the effective filtering area by increasing the cartridge diameter, such increase varies directly as the diameter increases so that a relatively large increase in diameter is required to provide a substantial increase in effective area.

The principal object of this invention is to provide a filter cartridge that will overcome the above and other limitations of known filter cartridges.

Another object of the invention is to proivde a filter cartridge in which the efficiency of radial flow of filtrate through filter cartridge discs is obtained without loss of filter medium in cutting such discs.

Another object of the invention is to provide such a filter cartridge in which the filtrate passes along a path of uniform width which does not converge as it approaches a central tubular core.

Another object of the invention is to provide such a filter cartridge which provides maximum utilization of filtering medium with maximum surface area without excessive depth of filter bed.

Another object of the invention is to provide such a filter cartridge in which the filtering medium is applied with ease.

Another object of the invention is to provide such a filter cartridge in which an increase in the radius thereof increases the effective filtering area as the square of the radius rather than directly, as is the case in known filter cartridges.

In one aspect of the invention, a central tube may have arranged longitudinally along it, pairs of spaced perforated discs. Adjacent perforated discs of alternate adjacent pairs of discs may be provided with impervious peripheral closures, forming chambers therebetween. Passages may be provided through the wall of the central tube opening into said chambers.

In another aspect of the invention, the spaces between the remaining adjacent perforated discs of alternate adjacent pairs of discs may be open at their peripheries and closed to the interior of the central tube.

In still another aspect of the invention, a strip of filtering medium may be wound involutely about the central core between the perforated discs of each spaced pair.

From the foregoing it is evident that the filtrate is exposed not only to the peripheral edges of each of the involute discs of filtering medium, but also to the circular area of one side of each disc. Furthermore, the filtrate is required to pass radially and transversely through each disc, emptying into the previously described chambers from which the filtrate passes into the center of the central tube.

The above, other objects and advantages of the new and improved cartridge for cartridge type filters will become apparent from the following specification and accompanying drawing which is merely exemplary.

Figure 1:
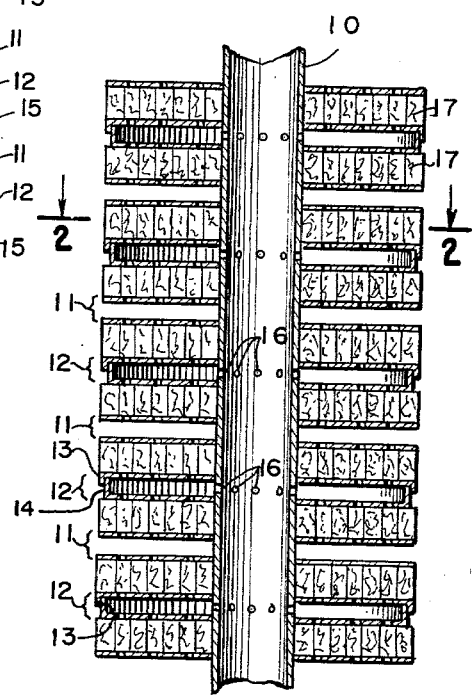
FIG. 1 is a sectional elevational view of a portion of a filter cartridge to which the principles of the invention have been applied.

Referring to the drawing, and particularly to FIG. 1, the principles of the invention are shown as applied to a cartridge type filter including a central tubular element 10. Pairs of spaced perforated discs 11 may be fixed in spaced relation along the tubular element 10. Additional pairs of spaced perforated discs 12 may be spaced along the element 10 in alternate relation with the discs 11.

The discs 12 may be provided with flanges 13 and 14. The discs 12 having flanges 14 may be slightly smaller in outside diameter than the discs 12 having flanges 13. The construction may be such that during assembly, the flanges 13 and 14 telescope, forming an imperforate peripheral wall between each pair of discs 12, forming a collecting chamber 15 between each pair of discs 12. Passage means 16 may extend from the interior of the tubular element 10 through its wall, forming communicating passages between each chamber 15 and the interior of tubular element 10.

The spaces between adjacent perforated discs 11, it will be noted, are open and no passages extend through the wall of the tubular element 10 between such discs 11.

Figure 2:
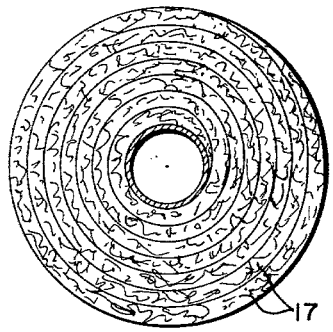
FIG. 2 is a plan view taken substantially along line 2—2 of FIG. 1.

Referring to FIG. 2, each space between adjacent perforated discs 11 and 12 may be filled with filtering medium. In the embodiment disclosed, the filtering medium may take the form of a strip 17 as wide as the spacing of adjacent discs 11 and 12, and of any convenient thickness. The strip may be wound involutely about the tubular element until the space between adjacent discs 11 and 12 is substantially full.

While the strips 17 of filtering medium may be made from a felt composed of natural fibers, it has been found that superior results can be achieved if the felt strip 17 is made from mechanically interlocked felted synthetic fibers. It will be understood that various combinations of synthetic fibers may be used and that synthetic fibers may be mixed with a minor amount of natural fibers and yet obtain many of the advantages of using synthetic fibers alone.

"Mechanically interlocked" is used herein to mean interlocking the fibers by needling or other similar mechanical processes in which the fibers are mechanically carried depthwise through the felt batt from which they are made. A batt, which can be referred to as a "carded batt," is prepared on a textile carding machine as is known in the manufacture of felt, such providing a plurality of layers of fibers. A plurality of barbed needles are arranged and operated so as to penetrate the thickness of the batt in such a manner as to cause fibers to move in a depthwise direction or across the layers of fiber of the batt. As the needles are withdrawn, the fibers will remain in their depthwise position where they have been carried so as to produce a mechanically interlocked felt. Both sides of the batt can be subjected to the needling treatment a plurality of times.

By employing synthetic fibers, particularly of the monofilament type, the construction will be uniform and it is possible to control accurately the size of pores so that a predetermined size of particles can be filtered out. It is possible to obtain synthetic fibers in a wide range of accurately sized fiber diameters or deniers, such as not obtainable in natural fibers. The preferred form will use monofilament fibers of one denier. The filter cartridge of the present invention has been found to have a very high solids capacity while at the same time maintaining very low pressure differential when in use, and can be designed with fibers of predetermined size to effectively retain particles of a known or desired size.

Figure 3:
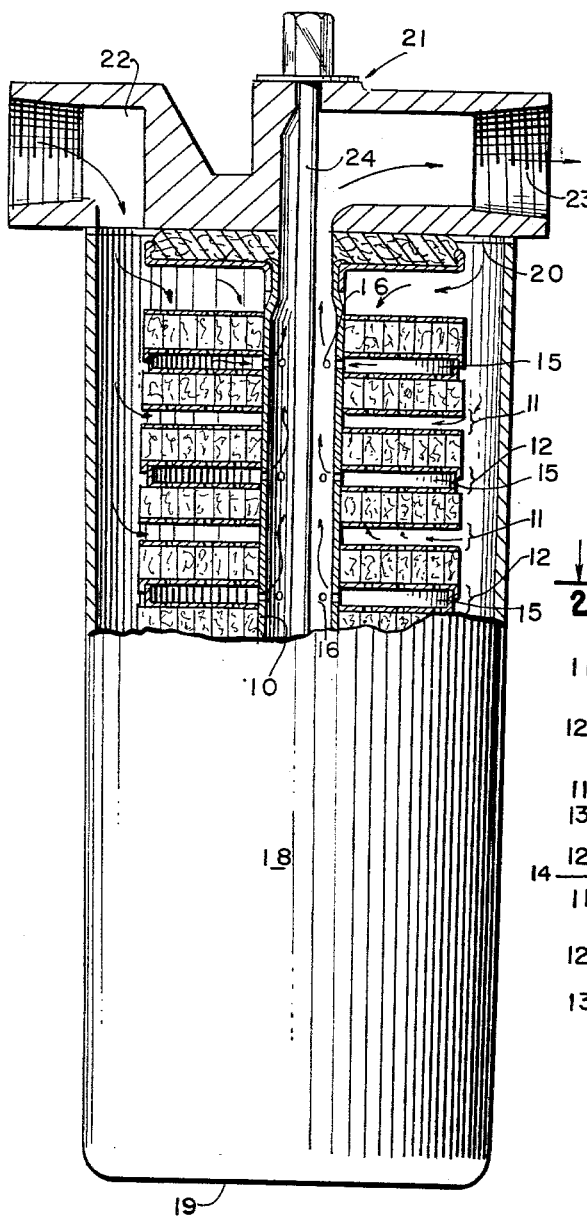
FIG. 3 is a sectional elevational view of a filter containing a cartridge to which the principles of the invention have been applied.

Referring to FIG. 3, a housing 18 may have a closed bottom 19 and an open top 20. A head 21 may have an inlet 22 and an outlet 23. The inlet 22 may communicate with an annular space surrounding the filter cartridge, while the outlet 23 may extend inwardly to the center of the head 21 and communicate with the interior of the tubular element 10. A through bolt 24 may be threaded into the bottom 19 of housing 18 and may lock the head 21 to the top of housing 18 with a gasket between the two.

From the foregoing it is evident that the liquid to be filtered passes through the inlet 22 into the annular space between the housing 18 and the filter cartridge, thence into the space between adjacent perforated discs 11. It is evident, therefore, that not only does the liquid to be filtered pass radially through the peripheral surfaces of each disc of filtering medium, but also through the circular area of one side of each such disc. The liquid to be filtered is required to pass completely through each disc, and the filtrate is collected within each compartment 15 from which it flows through passage means 16 to the interior of tubular element 10, thence out through the outlet 23.

Although the various features of the new and improved cartridge for cartridge type filters have been shown and described in detail to fully disclose one embodiment of the invention, it will be evident that changes may be made in such details and certain features may be used without others without departing from the principles of the invention.

What is claimed is:

A filter cartridge unit comprising a tubular core having a plurality of longitudinally spaced groups of peripherally disposed openings therethrough; a plurality of sets of four similarly radially dimensioned and perforated rigid discs in generally uniformly spaced parallel relationship along said core, the middle two of said group of four discs disposed to straddle one of said groups of said openings with each of said middle discs having an imperforate laterally extending edge flange portion constructed to telescope one flange portion within the other to form therebetween a fluid collecting chamber open only to one of said group of openings at the inner radius of the discs, and a filter media disposed within and filling the spaces between the first two and second two of said perforated discs, said filter media being an involutely wound strip of mechanically interlocked synthetic fiber felt of significant thickness and of a width substantially equal to the spacing between said discs.

References Cited in the file of this patent

UNITED STATES PATENTS

| | | |
|---|---|---|
| 879,856 | Darnall | Feb. 25, 1908 |
| 1,820,533 | Foley | Aug. 25, 1931 |
| 1,836,308 | Bull | Dec. 15, 1931 |
| 2,339,431 | Slayter | Jan. 18, 1944 |
| 2,713,016 | Weiss | July 12, 1955 |
| 2,731,152 | Redner | Jan. 17, 1956 |

FOREIGN PATENTS

| | | |
|---|---|---|
| 281,838 | Germany | Feb. 2, 1915 |
| 722,472 | Great Britain | Jan. 26, 1955 |

OTHER REFERENCES

"Textile Fibers Technical Information," Technical Service Section, Textile Fibers Dept., E. I. du Pont de Nemours & Co., Wilmington, Del., January 1957.

"Nonwoven Filter Media," Chem. Eng. Progress, vol. 53, No. 7, July 1957.